Nov. 12, 1929. J. A. HEINZ Re. 17,488

FLORAL RACK

Original Filed Oct. 29, 1926 3 Sheets-Sheet 1

Inventor
Julius A. Heinz, deceased
by
Kathryn K. Heinz
and
Fred B. Hamill, Executors.

Attorney

Nov. 12, 1929. J. A. HEINZ Re. 17,488

FLORAL RACK

Original Filed Oct. 29, 1926 3 Sheets-Sheet 2

Inventor
Julius A. Heinz, deceased,
by
Kathryn K. Heinz
Fred B. Hamill, Executors By Attorney Nov. 12, 1929. J. A. HEINZ Re. 17,488

FLORAL RACK

Original Filed Oct. 29, 1926 3 Sheets-Sheet 3

Inventor
Julius A. Heinz, deceased,
by
Kathryn K. Heinz
Fred B. Hamill, Executors By Attorney Reissued Nov. 12, 1929

Re. 17,488

UNITED STATES PATENT OFFICE

JULIUS A. HEINZ, DECEASED, LATE OF PESOTUM, ILLINOIS, BY KATHRYN KERWIN HEINZ, OF PESOTUM, ILLINOIS, AND FRED B. HAMILL, OF CHAMPAIGN, ILLINOIS, EXECUTORS, ASSIGNORS, BY MESNE ASSIGNMENTS, TO HEINZ FLORAL RACK CO., OF CHICAGO, ILLINOIS, A CORPORATION

FLORAL RACK

Original No. 1,652,937, dated December 13, 1927, Serial No. 145,060, filed October 29, 1926. Application for reissue filed May 18, 1929. Serial No. 364,259.

The said invention relates to floral racks designed for supporting floral pieces in a manner to display them in funeral parlors and the like, and it is an object of the present invention to provide a plurality of floral racks for the purpose mentioned which may be folded and packed in compact form for transporation and consisting of frame works which will be inconspicious and capable of supporting floral designs in different relative positions without the liability of being overturned or permitting the floral pieces to become disarranged.

A further object of the invention is to provide a floral rack of simple and inexpensive construction which may be placed upon a casket, or on the floor upon which the casket is supported, or on other desirable supports such as tables, chairs, or the like.

Figure 1:
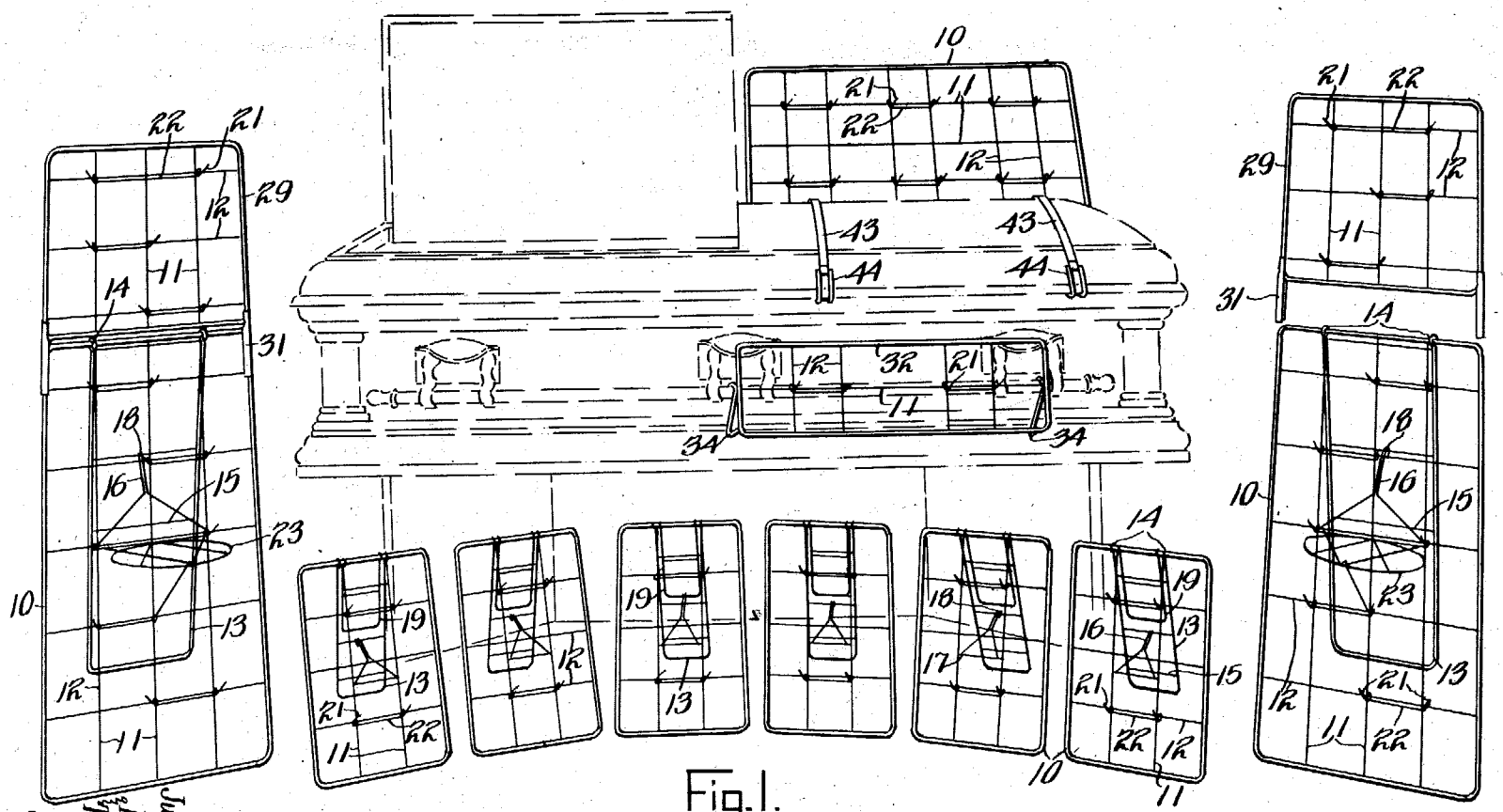
Figure 2:
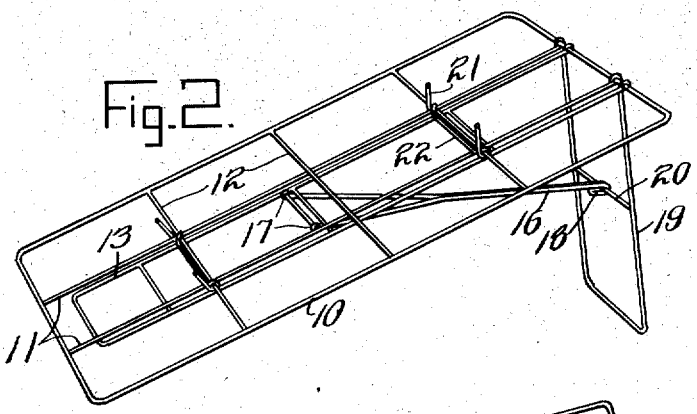
Figure 3:
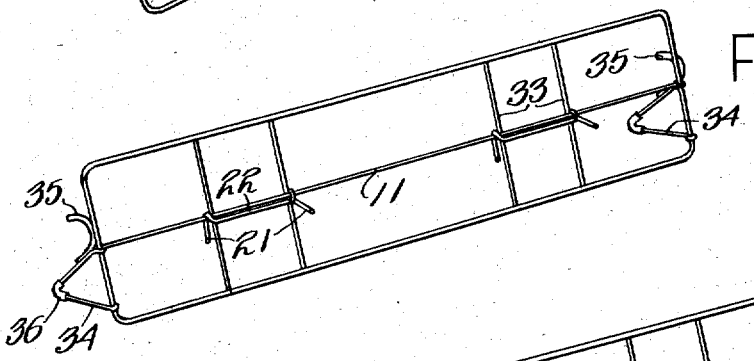
Figure 4:
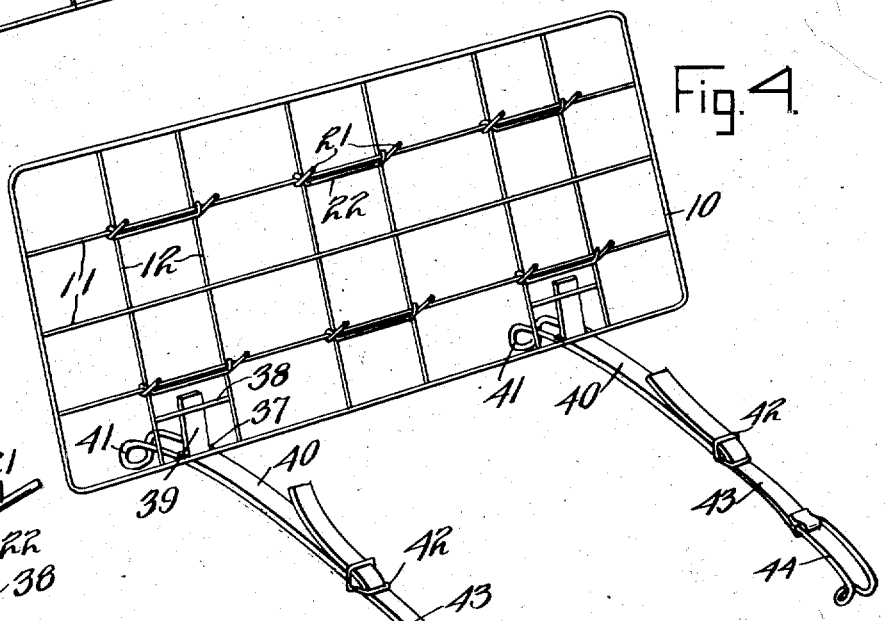
Figure 5:
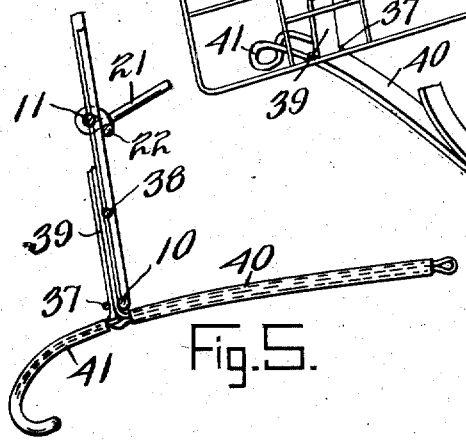
Figures 6, 7, 8:
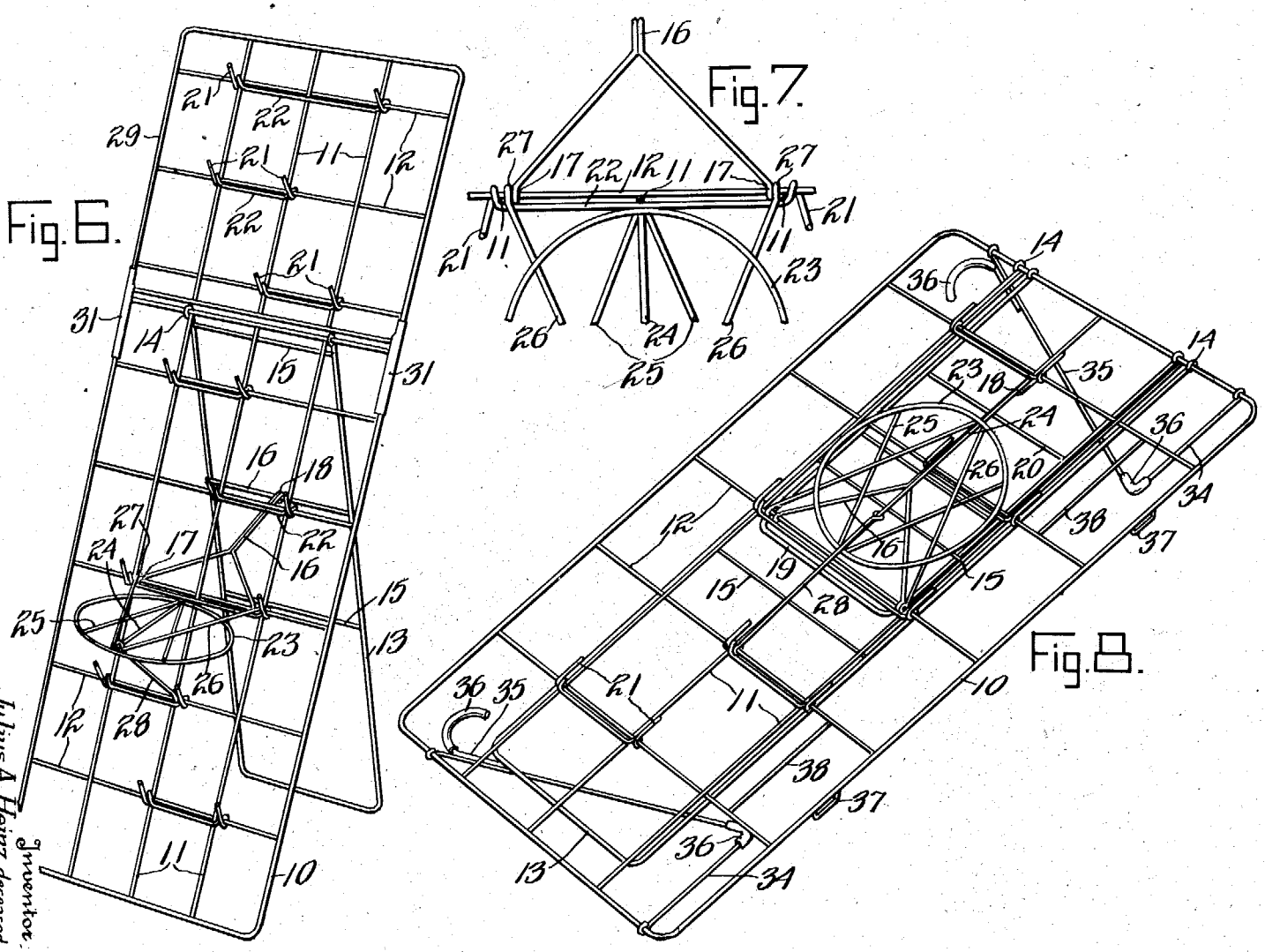

Referring to the accompanying drawings which are made a part hereof and on which similar reference characters indicate similar parts, Figure 1 is a perspective view of a number of floral racks disposed in display arrangement illustrating the application of my invention, Figure 2, a perspective of one of the racks shown in Figure 1 disposed in another position, Figure 3, a perspective illustrating the rack supported on the handles of the casket in Figure 1 resting upon a flat surface, Figure 4, a perspective illustrating the method of supporting the rack mounted on top of the casket in Figure 1, Figure 5, a detail of a portion of the structure shown in Figure 4, Figure 6, a perspective of one of the end racks shown in Figure 1, Figure 7, a detail of a portion of the structure shown in Figure 6, and Figure 8, a perspective of a rack in which is combined the racks of Figure 1 which may be used in any of the positions shown.

In the drawings reference character 10 indicates a frame which is preferably rectangular in form and constructed of wire or the like material. Said frame is preferably provided with rounded corners for an obvious purpose and having longitudinally disposed spaced rods 11 and transversely disposed spaced rods 12. The frame 10 is preferably formed of a single piece of material having its ends welded or otherwise united and to which frame the longitudinally and transversely disposed rods or wires are welded or otherwise secured to form neat joints.

A support 13 is provided for holding the frame at different angles of inclination and such support comprises a substantially rectangular frame having side standards bent around the end member of the frame to form pivot eyes 14 for connection therewith and a plurality of transverse cross members 15 are provided which strengthen such support. The side members of the support which are bent around the end of the frame forming pivot eyes 14 are preferably disposed on opposite sides of a pair of the longitudinally disposed members 11 so that such support will be maintained centrally of the frame as shown. A brace 16 is preferably pivoted on one of the transverse cross rods such brace being preferably formed of a single piece of wire folded centrally upon itself with its free ends diverging and bent around one of the transverse cross wires forming pivot eyes 17 while the opposite end of the brace is bent over to provide a hook 18 for engagement with one of the cross members 15 of the support. The support is preferably of substantially the same length as the frame which permits the frame to be held in a plurality of positions of angular adjustment, however, if desired, a shorter support 19 may be provided for permitting the frame to be held in a position more closely proximating a horizontal plane as shown in Figure 2 such shorter support 19 being provided with one or more cross rods 20. With such construction, the parts are so related that when the longer support 13 is collapsed (Fig. 8) it fits snugly on the under side of the rack against the cross members 11 and 12 and one of the rods 15 which connects the side members of the support is disposed in close proximity to the rod 12 on which the brace is pivoted and it is necessary, in order to hook the end of the brace over the cross member 20 of the shorter support, to flex the free end of the brace member upwardly whereupon it can be hooked over the cross member of the shorter support where it will be resiliently held against any accidental disengagement.

In order to hold floral pieces on the rack, I provide a plurality of supporting prongs 21, the same being preferably mounted in pairs and collapsible into position flat against the rack or substantially within the plane of the same. Each pair of said prongs constitutes the extremities of a piece of wire which extends beneath and around one of the transverse members 12, across a pair of the longitudinal members 11 and over and around the cross member 12. The prongs extend outwardly at substantially right angles to the longitudinal members 11. In other words, each prong is formed from a piece of wire which extends under and around one of the transverse members 12 and is connected by a bight 22 which extends across a pair of the longitudinal members 11. These prongs preferably diverge slightly as they are shown and as they are arranged in the small frame in Figure 1 they are disposed one over the other, however, in the larger frames, as shown in Figure 6, they are preferably disposed in staggered relation. The bight portion 22 which connects the prongs may extend across two longitudinal members 11 or three of such members as desired, both forms being illustrated in Figure 6.

In order to support an object such as a basket or vase of flowers in substantially horizontal position I provide a frame work or shelf which comprises (Fig. 7) a ring 23 having a diametrically disposed cross brace 24 and a pair of V-shaped braces 25 and 26. The point or angle of the V-shaped brace 25 disposed at one end of the diameter 24 and the point or angle of the other V-shaped brace 26 disposed at the opposite end of said diameter and with the diverging ends of said V-shaped brace 26 extending beyond the ring and bent around one of the transverse rods 12 to form pivot eyes 27.

In order to provide means for holding such shelf 23 in substantially horizontal position but permitting it to be collapsed against the body of the rack, I provide a link 28 which has its lower end bent around one of the cross members 12 to form a pivotal connection therewith and the opposite or upper end of said link is bent around the diameter 24 and is slidable around the same so that when the shelf or pivoted frame is in its substantially horizontal position the upper end of the link will engage the sides of the V-shaped brace 26.

If desired, an extension may be provided for the racks, said extension being formed of a rim 29 having cross members 11 and 12 extending respectively transversely and longitudinally thereof and also provided with flower supporting prongs 21. A pair of sheet metal members 31 are secured to the sides of the extension and are bent in substantially U-shape to telescope over the side members of the frame 10 permitting said extension to be readily attached to or detached from the main frame 10. The small racks shown at the center of Figure 1 and also in Figure 2 are preferably of a length corresponding to the width of the racks shown at each side of Figure 1 and the rack shown in Figure 6, therefore, when shipping the extension 29 for the end racks may be telescoped over one of the smaller racks 10.

Referring to Figure 3 a small rack 32 is provided which comprises a substantially rectangular frame with a central longitudinally extending rod 11 and two or more pairs of short cross rods 33. The longitudinally extending center rod forms a support for one or more pairs of diverging prongs 21 connected together by bight 22. At the end of the frame is secured a bracket 34 which comprises a wire bent upon itself at an angle of substantially 45 degrees with one shorter side of said angle disposed at substantially right angles to the side of the frame and bent around such frame to form a pivotal connection therewith, while the other side of said angle is considerably longer but is secured adjacent the middle of the frame in a manner similar to the opposite end of the bracket. This bracket permits the frame to incline slightly when resting on a substantially flat surface and in order to permit the frame to be secured on the handles of a casket a hook 35 is attached to each of the upper longer legs of the bracket. This hook 35 will readily engage the handles of a casket or any other object as for example a radiator or the like and serve to support the frame thereon. In order to prevent the angle members from scratching the sides of the casket or the furniture the same is preferably provided with a short section of rubber tubing 36.

A rack 10 may be provided with means for securing the same on the top of a casket, as shown in Figure 4, such rack being provided with transversely and longitudinally disposed cross bars. In order to support the rack frame in position such frame is preferably provided with loops 37 and co-operating cross bars 38, each of said loops being adapted to receive the upstanding arm 39 of a felt covered bracket 40 having a hook 41 pivoted at one end and adjustably connected by means of a buckle 42 with a strap 43 having an additional smaller hook 44 secured at its opposite end. The hook 41 is arranged to engage the rear edge of the casket top and the hook 44 is arranged to engage the front edge of such casket top and vice versa, the straps and buckle arrangement permitting the requisite adjustment for caskets of different sizes.

While it is the intention that the racks be arranged according to the display shown in Figure 1 in which four sizes of racks are used and it is also the intention to supply the racks in sets of ten if desired, nevertheless, a combination rack (see Fig. 8) may be provided and which is capable of use in the capacity of either of the racks shown in Figure 1. This rack may be stood up as the end racks of such figure by resting the same and its support 13 on the floor and the rack 29 may or may not be mounted thereon. The same rack may be supported by the short support 19 in the manner illustrated in Figure 2. Further it may be supported on its side by the brackets 34 or the hooks 35, as in Fig. 3, or if desired it may be supported by means of the loops 37 and cross rods 38 on the top of a casket or other object.

It will be obvious to those skilled in the art that various changes may be made in this device without departing from the spirit of the invention, and it is, therefore, not limited to what is shown in the drawings and described in the specification, but only as set forth in the appended claims.

Having thus fully described this invention, what is claimed as new and desired to be secured by Letters Patent, is:

1. A floral rack comprising a supporting frame having spaced transverse and longitudinally disposed cross members, means for supporting said frame in various angular positions, means for supporting a floral piece upon said frame comprising a body extending over one of said cross members and extending around another cross member and projecting outwardly to form prongs, an element pivotally connected to said frame for holding an object to be displayed, and an element for maintaining said object holding element in substantially horizontal position, substantially as set forth.

2. A floral rack comprising a supporting frame, selectively adjustable supports of different lengths connected with the frame for supporting the same in a plurality of positions of angular adjustment, a shelf pivoted on said frame, a rod connected at the outer edge of said shelf and to the inner edge of said shelf substantially adjacent its pivotal connection, and a link having one end connected to said frame below said shelf and having its upper end slidable along said rod, substantially as set forth.

3. A floral rack comprising a supporting frame having spaced transverse and longitudinally disposed cross members, means for supporting said frame in various angular positions, means for supporting a floral piece upon said frame comprising a body extending over one of said cross members and extending around another cross member and projecting outwardly to form prongs, a shelf pivoted on said frame, a rod connected at the outer edge of said shelf and to the inner edge of said shelf substantially adjacent its pivotal connection, and a link having one end connected to said frame below said shelf and having its upper end slidable along said rod, substantially as set forth.

4. A floral rack comprising a supporting frame and brackets pivoted at the sides of said frame and adapted to engage a supporting surface for maintaining the frame in substantially upright position, said brackets being movable into position substantially flat against the body of the frame, the upper ends of said brackets being provided with hooks for engagement with objects upon which the frame is adapted to be supported, and the lower rearmost portions of said brackets being adapted to engage the sides of the object upon which the frame is supported, substantially as set forth.

5. The combination in a floral rack comprising a frame having transversely and longitudinally extending cross members, pivoted supporting elements connected at one end of said frame for maintaining the frame in various angular positions, means connected at each end of said frame for supporting the same on its side on a surface or for suspending the same, and means carried by said frame for the reception of an upstanding supporting element whereby the frame may be supported thereby, substantially as set forth.

6. The combination of a substantially rectangular floral rack, a smaller floral rack of a length corresponding to the width of said first-mentioned floral rack and a frame for connection with the larger of said racks at the end of the same or at the side of the smaller rack, substantially as set forth.

7. A floral rack of substantially rectangular shape, a smaller floral rack of similar shape and of a length corresponding to the width of said first-mentioned rack, a frame having opposed curved members extending beyond one edge of said frame and slidable over the side members of the larger rack or over the end members of the smaller rack, substantially as set forth.

8. A folding floral rack comprising a main frame, folding supports of different lengths pivoted to said frame for supporting the same in different angular positions, and a bar adjustably connecting the frame and support for holding the same relatively fixed, said member being arranged to hold one of said folding supports against the underside of the frame for reinforcing the same, substantially as set forth.

9. A folding floral rack comprising a main frame, folding supports of different lengths pivoted to said frame for supporting the same in different angular positions, and a member adjustably connecting the frame and support for holding the same relatively fixed, said member being arranged to hold one of said folding supports against the underside of the frame for reinforcing the same, said adjustable connecting member being deformed towards connected position by the folding support held against the underside of the frame, substantially as set forth.

10. The combination of a floral rack comprising a supporting frame, a supporting member pivotally mounted on said supporting frame for supporting the object to be displayed and having object engaging prongs, and means for supporting said frame in position to display a floral piece on a curved surface comprising hooks adapted to engage over opposite edges of the curved surface, means adjustably connecting said hooks, and a bracket having an upstanding arm, associated with one of said hooks, substantially as set forth.

11. A floral rack comprising the combination of a bracket having an upstanding arm, means for securing said bracket on an object with the upstanding arm in inclined position, a rack having means for engaging the upstanding arm of said bracket whereby the rack will be maintained in upright position for displaying floral pieces, a supporting member pivotally mounted upon said rack for supporting the floral pieces to be displayed and having object engaging prongs, substantially as set forth.

12. A device of the class described comprising a frame having crossed rods thereon, means for supporting said frame in position to display an object, a supporting member pivotally mounted upon the frame and having object engaging prongs for supporting the object to be displayed, and a shelf associated with said frame for supporting an object, substantially as set forth.

13. A floral rack fabricated of rods or wires having means thereon for supporting floral pieces, and brackets and hooks for supporting said rack either on a flat surface or for suspending the same, said brackets being provided with means whereby they may be collapsed against said rack, substantially as set forth.

14. A floral rack comprising a wire frame, standards of different lengths connected with the frame for supporting the same in a plurality of positions of angular adjustment, and a supporting member looped about the frame for pivotal movement against the body of the frame, said supporting member having object engaging fingers, means to maintain the same in position of use, and a detachable extension for said frame, substantially as set forth.

15. A floral rack comprising a wire frame, standards of different lengths connected with the frame for supporting the same in a plurality of positions of angular adjustment, and a supporting member looped about the frame for pivotal movement against the body of the frame, said supporting member having object engaging fingers, and means for supporting said frame on a curved surface in a position to display a floral piece, substantially as set forth.

In witness whereof, we have hereunto set our hands at Champaign, Illinois, this 8th day of May, A. D. one thousand, nine hundred and twenty-nine.

KATHRYN KERWIN HEINZ,
FRED B. HAMILL,
*Executors of Julius A. Heinz, Deceased.*